(12) United States Patent
Li et al.

(10) Patent No.: US 10,376,836 B2
(45) Date of Patent: Aug. 13, 2019

(54) DESULFURIZER FOR CONVERSION AND ABSORPTION OF HIGH-CONCENTRATION CARBONYL SULFIDE AND A DESULFURIZER FOR CATALYTIC CONVERSION AND ABSORPTION OF CARBON DISULFIDE AND THEIR PREPARATION METHODS

(71) Applicant: BEIJING SJ ENVIRONMENTAL PROTECTION AND NEW MATERIAL CO., LTD., Beijing (CN)

(72) Inventors: Liying Li, Beijing (CN); Wenwen Song, Beijing (CN); Wenjun Mao, Beijing (CN); Zhimin Zhang, Beijing (CN); Boshu Liu, Beijing (CN); Zhenyi Liu, Beijing (CN)

(73) Assignee: BEIJING SJ ENVIRONMENTAL PROTECTION AND NEW MATERIAL CO., LTD., Beijing (CN)

( * ) Notice: Subject to any disclaimer, the term of this patent is extended or adjusted under 35 U.S.C. 154(b) by 2 days.

(21) Appl. No.: 15/108,968

(22) PCT Filed: Dec. 30, 2014

(86) PCT No.: PCT/CN2014/095470
§ 371 (c)(1),
(2) Date: Jun. 29, 2016

(87) PCT Pub. No.: WO2015/101275
PCT Pub. Date: Jul. 9, 2015

(65) Prior Publication Data
US 2016/0325226 A1    Nov. 10, 2016

(30) Foreign Application Priority Data

Dec. 31, 2013  (CN) .......................... 2013 1 0751120
Dec. 31, 2013  (CN) .......................... 2013 1 0751598

(51) Int. Cl.
| | | |
|---|---|---|
| *B01D 53/80* | (2006.01) |
| *B01D 53/48* | (2006.01) |
| *B01J 20/02* | (2006.01) |
| *B01J 20/04* | (2006.01) |
| *B01J 20/08* | (2006.01) |
| *B01J 20/12* | (2006.01) |
| *B01J 20/30* | (2006.01) |
| *B01J 21/16* | (2006.01) |

(Continued)

(52) U.S. Cl.
CPC .......... *B01D 53/80* (2013.01); *B01D 53/485* (2013.01); *B01J 20/0229* (2013.01); *B01J 20/041* (2013.01); *B01J 20/08* (2013.01); *B01J 20/12* (2013.01); *B01J 20/3007* (2013.01); *B01J 20/3014* (2013.01); *B01J 20/3071* (2013.01); *B01J 20/3078* (2013.01); *B01J 20/3085* (2013.01); *B01J 21/04* (2013.01); *B01J 21/063* (2013.01); *B01J 21/16* (2013.01); *B01J 23/78* (2013.01); *B01J 37/0036* (2013.01); *B01J 37/031* (2013.01); *B01J 37/04* (2013.01); *B01J 37/08* (2013.01); *B01J 37/088* (2013.01); *B01D 2251/602* (2013.01); *B01D 2257/308* (2013.01); *B01J 37/0009* (2013.01); *B01J 37/06* (2013.01)

(58) Field of Classification Search
CPC ........ B01D 53/80; B01D 53/485; B01J 21/16; B01J 23/78; B01J 37/009; B01J 37/04; B01J 37/08; B01J 37/06; B01J 20/12; B01J 20/041; B01J 20/08; B01J 20/0229; B01J 20/3007; B01J 20/3014; B01J 20/3071; B01J 20/3078; B01J 20/3085
See application file for complete search history.

(56) References Cited

U.S. PATENT DOCUMENTS

| | | | | |
|---|---|---|---|---|
| 2004/0033192 A1* | 2/2004 | Nedez | ................ | B01D 53/8612 423/574.1 |
| 2009/0272675 A1* | 11/2009 | Ratnasamy | .......... | B01J 20/0222 208/227 |

FOREIGN PATENT DOCUMENTS

| | | |
|---|---|---|
| CN | 1069673 A | 3/1993 |
| CN | 1134312 A | 10/1996 |

(Continued)

OTHER PUBLICATIONS

Wetchakun et. al., Influence of calcination temperature of anatase to rutile phase transformation in TiO2 nanoparticles synthesized by the modified sol-gel method, 2012, Materials Letters, 82, 195-198.*

(Continued)

*Primary Examiner* — James A Fiorito
(74) *Attorney, Agent, or Firm* — Lee & Hayes, P.C.

(57) ABSTRACT

Provided is a high-concentration carbonyl sulfide conversion-absorption type desulfurizer for use at medium-low temperature and preparation method thereof. The desulfurizer comprises 50%-75% magnetic iron oxide red ($Fe_{21.333}O_{32}$), 5%-10% alkali metal oxide ($K_2O$), 5-35% anatase $TiO_2$, and 5-10% shaping binder. The method of preparing the desulfurizer comprises: uniformly mixing a metatitanic acid prepared using ferrous sulfate recycled as a by-product from titanium dioxide production with $K_2CO_3$, calcining to activate at 500° C.-700° C., mixing with the magnetic iron oxide red and binder, roll molding at room temperature to form balls which are dried at 100° C.-150° C. to obtain the desulfurizer. The desulfurizer has a hydrolysis conversion of carbonyl sulfide higher than 99%, and has a higher sulfur capacity more than 25%.

6 Claims, 1 Drawing Sheet

(51) Int. Cl.
*B01J 23/78* (2006.01)
*B01J 37/04* (2006.01)
*B01J 37/08* (2006.01)
*B01J 37/03* (2006.01)
*B01J 21/04* (2006.01)
*B01J 21/06* (2006.01)
*B01J 37/00* (2006.01)
*B01J 37/06* (2006.01)

(56) References Cited

FOREIGN PATENT DOCUMENTS

| CN | 1304781 A | 7/2001 |
|---|---|---|
| CN | 1340373 A | 3/2002 |
| CN | 1680025 A | 10/2005 |
| CN | 101121123 A | 2/2008 |
| CN | 101585557 A | 11/2009 |
| CN | 103183389 A | 7/2013 |
| CN | 103357392 A | 10/2013 |
| JP | 06218230 A | 8/1994 |
| WO | WO2013097404 A1 * | 7/2013 |

OTHER PUBLICATIONS

WO 2013097404A1 (Machine Translation).*
Translated Chinese Office Action dated Oct. 8, 2016 for Chinese Application No. 201310751120.0, 15 pages.
Translated Chinese Office Action dated Oct. 8, 2016 for Chinese Application No. 201310751598.3, 15 pages.
International Search Report for Application No. PCT/CN2014/095470, dated Apr. 3, 2015, 4 pages.
Ju et al, "Study of hydrolysis reactivity of carbon disulfide over alumina catalyst," Journal of Fuel Chemistry and Technology, Jun. 1997, vol. 25, No. 3, 9 pages.

* cited by examiner

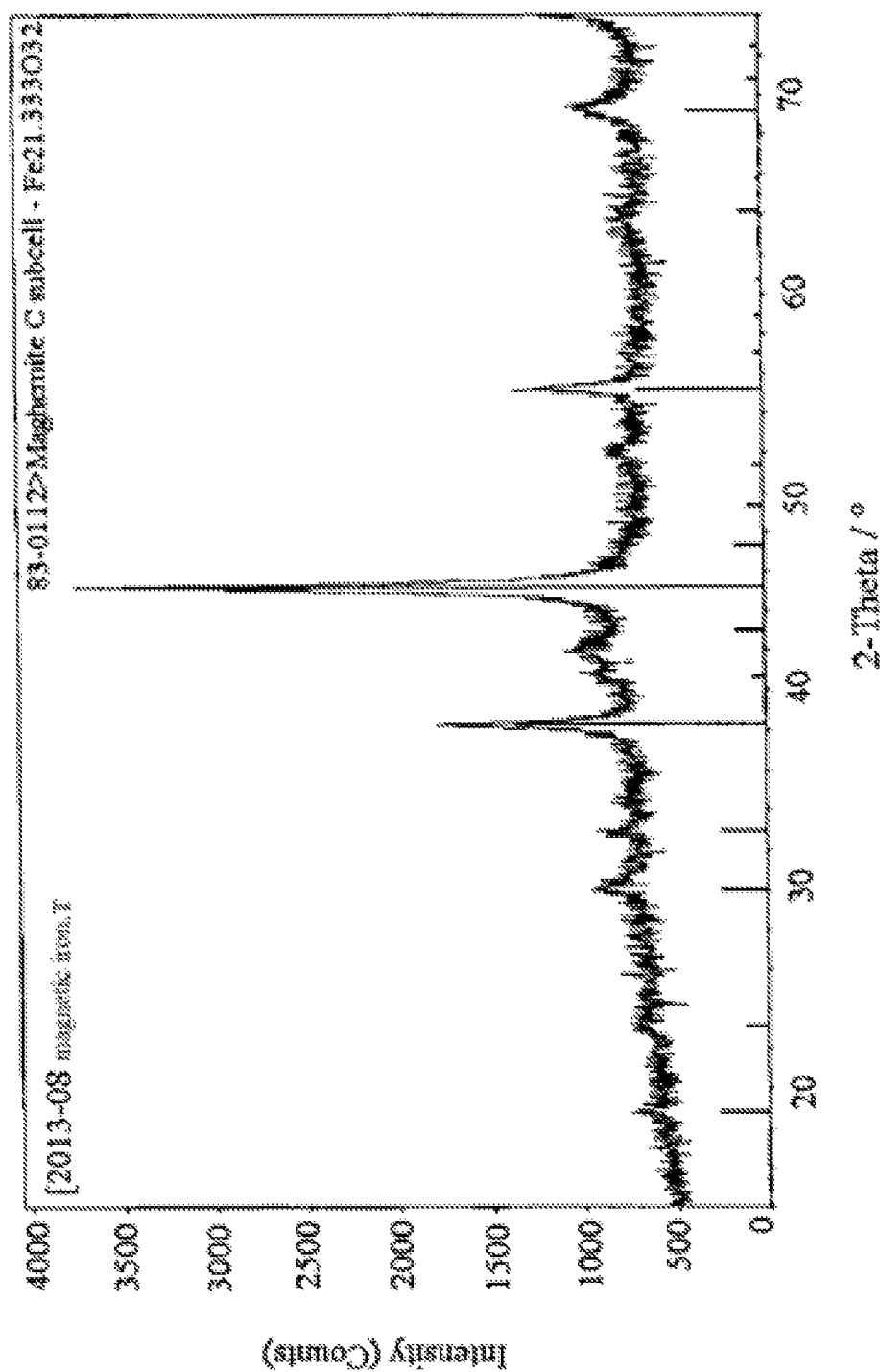

DESULFURIZER FOR CONVERSION AND ABSORPTION OF HIGH-CONCENTRATION CARBONYL SULFIDE AND A DESULFURIZER FOR CATALYTIC CONVERSION AND ABSORPTION OF CARBON DISULFIDE AND THEIR PREPARATION METHODS

The present application is a U.S. National Phase Application of International Application No. PCT/CN2014/095470, filed Dec. 30, 2014, which claims the benefit of Chinese Application No. 201310751598.3, filed Dec. 31, 2013, and Chinese Application No. 201310751120.0, filed Dec. 31, 2013, all of which are hereby incorporated by reference in their entirety.

FIELD OF THE INVENTION

The present invention relates to a desulfurizer for catalytic conversion and absorption of carbonyl sulfide contained in a gas and a desulfurizer for catalytic conversion and absorption of carbon disulfide in a gas and preparation methods thereof, belonging to desulfurization technical field.

BACKGROUND OF THE INVENTION

It is well known organic sulfur widely exists in a feed gas produced by a chemical method using coal, gas and oil as raw materials, and its presence will cause poisoning deactivation of a catalyst in the subsequent processes. More and more studies and researches have been carried out for developing new technologies, such as preparation technologies of a feed gas using a low-grade coal and a coke-oven gas, coal-gas poly-generation technologies, and low-temperature steam transformation technologies.

Carbonyl sulfide is neutral or slightly acidic, and has a stable chemical property, so it is difficult to be removed completely by using a conventional desulphurization method. There are two removal methods of carbonyl sulfide in industry, i.e. dry desulfurization and wet desulphurization. Fine desulfurization is difficult to be realized by the wet desulphurization as restricted by factors such as chemical equilibrium, so carbonyl sulfide is generally removed by the dry desulfurization method wherein the carbonyl sulfide is converted into hydrogen sulfide by hydrogenolysis or hydrolysis in order for removal. Dry desulfurization generally comprises two methods, i.e. hydrolysis method and hydrogenolysis method. There are two kinds of catalysts for carbonyl sulfide hydrolysis at home and abroad. The first one is a simple conversion type hydrolysis catalyst which only has conversion effect on the carbonyl sulfide and has to be used in combination with a desulfurizer such as zinc oxide and activated carbon. The second one is conversion-adsorption type hydrolysis catalyst which not only has a conversion effect on an organic sulfur such as carbonyl sulfide, but also has an absorption effect on hydrogen sulfide converted from the organic sulfur, so it can be used alone for removal of trace sulfur. In recent years, a conversion-adsorption type bifunctional desulfurizer has drawn a great attention. For example, Chinese patent application CN1069673A discloses a catalyst for organic sulfur hydrolysis at room temperature, comprising potassium carbonate in an amount of 2-25 wt % and a spherical γ-$Al_2O_3$. When this desulfurizer is used at room temperature, the conversion rate of carbonyl sulfide reaches up to 95%, and it is capable of converting the carbonyl sulfide while absorbing hydrogen sulfide. Although the above desulfurizer for carbonyl sulfide conversion can reach a higher conversion rate at room temperature, the disadvantage is that it is just applicable to treat carbonyl sulfide with a lower concentration, such as no more than 30 mgS/m³, but is not applicable to treat carbonyl sulfide with a high concentration. Therefore, the problem to be solved in the prior art is how to develop a desulfurizer that can realize efficient conversion and absorption of a high-concentration carbonyl sulfide. In a chemical feed gas, $CS_2$ generally exists in an amount of approximately 10% of the amount of COS. $CS_2$ is a polar molecule and its hydrolytic process is as below:

$$CS_2 + H_2O \rightarrow COS + H_2S \qquad (1)$$

$$COS + H_2O \rightarrow CO_2 + H_2S \qquad (2)$$

$$CS_2 + CO_2 \rightarrow 2COS \qquad (3)$$

In the above process, $CS_2$ is converted into COS. The hydrolysis conversion rate of $CS_2$ is subjected to influences of carbonic oxide and hydrogen sulfide atmospheres, and it is difficult to realize a complete removal of $CS_2$. In the prior art, Chinese patent application CN10112123A discloses a catalyst for carbon disulfide hydrolysis under moderate temperature, comprising a spherical γ-$Al_2O_3$ as a carrier, alkali metal oxide $K_2O$ as a promoter, and zirconium dioxide $ZrO_2$ and a rare-earth metal oxide $La_2O_3$ as a modifier, and prepared by an incipient-wetness impregnation method comprising impregnating the promoter and modifier followed by calcinations. The obtained catalyst has a better performance against carbon deposition and side reactions not contributing to the conversion.

Although the above catalyst has a high efficiency for treatment of $CS_2$ under certain conditions, it is only applicable to treat $CS_2$ with a concentration range of 200-500 mgS/m³, but not applicable to treat $CS_2$ with a high concentration. Therefore, the problem to be solved in the prior art is how to develop a desulfurizer which can achieve efficient conversion and absorption of a high-concentration $CS_2$.

SUMMARY OF THE INVENTION

In order to solve the problem that the hydrolysis catalyst for carbonyl sulfide in the prior art is inapplicable under conditions where the carbonyl sulfide has a high-concentration, the present invention provides a desulfurizer for conversion and absorption of carbonyl sulfide with a wide-range concentration, and also provides a method for preparing the desulfurizer.

In another aspect, in order to solve the problem that the hydrolysis catalyst of $CS_2$ in the prior art is inapplicable under conditions where $CS_2$ has a high concentration, the present invention provides a desulfurizer for conversion and absorption of $CS_2$ with a wide-range concentration, and also provides a method for preparing the desulfurizer.

In one aspect, the present invention provides a desulfurizer for conversion and absorption of high-concentration carbonyl sulfide, comprising:
  magnetic iron oxide red $Fe_{21.333}O_{32}$ in an amount of 50-75 parts by weight; $K_2O$ in an amount of 5-10 parts by weight;
  anatase-type $TiO_2$ in an amount of 5-35 parts by weight; and
  a binder in an amount of 5-10 parts by weight.
  In accordance with one embodiment, the binder is selected from a group consisting of bentonite, kaolin clay, attapulgite, Yang Gan soil and any combination thereof.

In another aspect, the present invention provides a method for preparing the desulfurizer, comprising:

(1) mixing and reacting a $FeSO_4$ solution with an alkaline substance solution or solid by controlling the alkali ratio of the alkaline substance solution or solid and the $FeSO_4$ solution to 1-1.1 to form a first mixture, filtering the first mixture to yield a filter cake, and calcining the filter cake at a temperature of 250-400° C. to yield the magnetic iron oxide red $Fe_{21.333}O_{32}$; or mixing and kneading a $FeSO_4$ solid with an alkaline substance solid by controlling the alkali ratio of the alkaline substance solid and the $FeSO_4$ solid to 1-1.1 to form a first mixture, followed by washing with water and filtering the first mixture to yield a filter cake, and calcining the filter cake at a temperature of 250-400° C. to yield the magnetic iron oxide red $Fe_{21.333}O_{32}$; and (2) mixing 50-75 parts by weight of the magnetic iron oxide red $Fe_{21.333}O_{32}$ with 5-35 parts by weight of anatase type $TiO_2$, 5-10 parts by weight of $K_2O$ and 5-10 parts by weight of a binder to form a second mixture, followed by roll molding at room temperature and drying the second mixture to produce the desulfurizer.

In accordance with one embodiment, the filter cake in the step (1) is calcined at 350° C. for 2-5 hours.

In accordance with one embodiment, the alkaline substance is selected from the group consisting of hydroxides of Group IA, $Na_2CO_3$, $(NH_4)_2CO_3$, $K_2CO_3$, $NaHCO_3$, $NH_4HCO_3$, $KHCO_3$ and any combination thereof.

In accordance with one embodiment, the anatase type $TiO_2$ and $K_2O$ in Step (2) are prepared by mixing and calcining 6.1-42.7 parts by weight of metatitanic acid and 7.3-14.7 parts by weight of $K_2CO_3$ at a temperature of 500-700° C.

In accordance with one embodiment, the metatitanic acid is prepared by a method comprising preparing a ferrous sulfate solution by dissolving a ferrous sulfate solid in water, wherein the ferrous sulfate solid is a by-product from titanium dioxide production by a sulfuric acid method, heating the ferrous sulfate solution up to 40-100° C., adjusting a pH value of the ferrous sulfate solution to 1-2 by adding an acid, and reacting the ferrous sulfate solution with a flocculating agent to yield a precipitate, followed by filtering the precipitate to obtain the metatitanic acid.

In accordance with one embodiment, the ferrous sulfate solution has a $FeSO_4$ concentration of 1-2.5 mol/L.

In accordance with one embodiment, the acid added for adjusting the pH value is selected from the group consisting of nitric acid, hydrochloric acid, sulfuric acid and any combination thereof.

In accordance with one embodiment, the step (1) of the method for preparing the desulfurizer for conversion and absorption of high-concentration carbonyl sulfide of the present invention comprises: mixing and reacting a $FeSO_4$ solution with an alkaline substance solution or solid by controlling the alkali ratio of the alkaline substance solution or solid and the $FeSO_4$ solution to 1-1.1 to form a first mixture, filtering the first mixture to yield a filter cake, and calcining the filter cake at a temperature of 250-400° C. to yield the magnetic iron oxide red $Fe_{21.333}O_{32}$. By mixing the $FeSO_4$ solution with the alkaline substance solution or solid, they will react to produce a precipitate. In a preferred embodiment, the precipitate is filtered to obtain a filter cake, then the filter cake is washed with water prior to calcinations. Alternatively, the above reactions can be realized through solid phase reactions by mixing and kneading a $FeSO_4$ solid with an alkaline substance solid by controlling the alkali ratio of the alkaline substance solid and the $FeSO_4$ solid to 1-1.1 to form a first mixture, followed by washing with water and filtering the first mixture to yield a filter cake, and calcining the filter cake at a temperature of 250-400° C. to yield the magnetic iron oxide red $Fe_{21.333}O_{32}$.

In accordance with one embodiment, the step (2) comprises mixing 50-75 parts by weight of the magnetic iron oxide red $Fe_{21.333}O_{32}$ with 5-35 parts by weight of anatase type $TiO_2$, 5-10 parts by weight of $K_2O$ and 5-10 parts by weight of a binder to form a second mixture, followed by roll molding at room temperature and drying the second mixture to produce the desulfurizer.

In a preferred embodiment, the anatase type $TiO_2$ and $K_2O$ in the step (2) are prepared by mixing and calcining 6.1-42.7 parts by weight of metatitanic acid ($TiO(OH)_2$) and 7.3-14.7 parts by weight of $K_2CO_3$ at a temperature of 500-700° C. The inventors found that the desulfurizer, prepared using the mixture of the anatase-type $TiO_2$ and $K_2O$ obtained by calcining the metatitanic acid and $K_2CO_3$ together, has an unexpectedly excellent sulfur capacity.

In another aspect, the present invention provides a desulfurizer for catalytic conversion and absorption of carbon disulfide, comprising magnetic iron oxide red $Fe_{21.333}O_{32}$ in an amount of 50-75 parts by weight;

anatase-type $TiO_2$ in an amount of 5-15 parts by weight;

$K_2O$ in an amount of 2-8 parts by weight;

$\gamma$-$Al_2O_3$ in an amount of 5-20 parts by weight; and a binder in an amount of 5-10 parts by weight.

In accordance with one embodiment, the binder is selected from the group consisting of bentonite, kaolin clay, attapulgite, Yang Gan soil and any combination thereof. In another aspect, the present invention provides a method for preparing the desulfurizer for catalytic conversion and absorption of carbon disulfide, comprising (1) mixing and reacting a $FeSO_4$ solution with an alkaline substance solution or solid by controlling the alkali ratio of the alkaline substance solution or solid and the $FeSO_4$ solution to 1-1.1 to form a first mixture, filtering the first mixture to yield a filter cake, and calcining the filter cake at a temperature of 250-400° C. to yield the magnetic iron oxide red $Fe_{21.333}O_{32}$; or mixing and kneading a $FeSO_4$ solid with an alkaline substance solid by controlling the alkali ratio of the alkaline substance solid and the $FeSO_4$ solid to 1-1.1 to form a first mixture, followed by washing with water and filtering the first mixture to yield a filter cake, and calcining the filter cake at a temperature of 250-400° C. to yield the magnetic iron oxide red $Fe_{21.333}O_{32}$; and (2) mixing 50-75 parts by weight of the magnetic iron oxide red $Fe_{21.333}O_{32}$ with 5-15 parts by weight of anatase-type $TiO_2$, 2-8 parts by weight of $K_2O$, 5-20 parts by weight of $\gamma$-$Al_2O_3$ and 5-10 parts by weight of a binder to form a second mixture, followed by roll molding at room temperature and drying the second mixture to produce the desulfurizer.

In accordance with one embodiment, the filter cake in the step (1) is calcined at 350° C. for 2-5 hours.

In accordance with one embodiment, the alkaline substance is selected from the group consisting of hydroxides of Group IA, $Na_2CO_3$, $(NH_4)_2CO_3$, $K_2CO_3$, $NaHCO_3$, $NH_4HCO_3$, $KHCO_3$ and any combination thereof.

In accordance with one embodiment, the anatase-type $TiO_2$, $K_2O$ and $\gamma$-$Al_2O_3$ in step (2) are prepared by mixing and calcining 6.1-18.4 parts by weight of metatitanic acid, 2.9-11.7 parts by weight of $K_2CO_3$ and 5.9-23.5 parts by weight of pseudo-boehmite at a temperature of 500-700° C.

In accordance with one embodiment, the metatitanic acid is prepared by a method comprising
preparing a ferrous sulfate solution by dissolving a ferrous sulfate solid in water, wherein the ferrous sulfate solid is a by-product from titanium dioxide production by a sulfuric acid method,
heating the ferrous sulfate solution up to 40-100° C.,
adjusting a pH value of the ferrous sulfate solution to 1-2 by adding an acid, and
reacting the ferrous sulfate solution with a flocculating agent to yield a precipitate, followed by filtering the precipitate to obtain the metatitanic acid.

In accordance with one embodiment, the ferrous sulfate solution has a $FeSO_4$ concentration of 1-2.5 mol/L.

In accordance with one embodiment, the acid added for adjusting the pH value is selected from the group consisting of nitric acid, hydrochloric acid, sulfuric acid and any combination thereof.

In accordance with one embodiment, the step (1) of the method for preparing the desulfurizer for catalytic conversion and absorption of carbon disulfide comprises mixing and reacting a $FeSO_4$ solution with an alkaline substance solution or solid by controlling the alkali ratio of the alkaline substance solution or solid and the $FeSO_4$ solution to 1-1.1 to form a first mixture, filtering the first mixture to yield a filter cake, and calcining the filter cake at a temperature of 250-400° C. to yield the magnetic iron oxide red $Fe_{21.333}O_{32}$. In this manner, by mixing the $FeSO_4$ solution with the alkaline substance solution or solid, they will react to produce a precipitate. In an preferred embodiment, the precipitate is filtered to obtain a filter cake, then the filter cake is washed with water prior to calcinations.

Alternatively, the above reactions can be realized through solid phase reactions by mixing and kneading a $FeSO_4$ solid with an alkaline substance solid by controlling the alkali ratio of the alkaline substance solid and the $FeSO_4$ solid to 1-1.1 to form a first mixture, followed by washing with water and filtering the first mixture to yield a filter cake, and calcining the filter cake at a temperature of 250-400° C. to yield the magnetic iron oxide red $Fe_{21.333}O_{32}$.

In accordance with one embodiment, the step (2) comprises mixing 50-75 parts by weight of the magnetic iron oxide red $Fe_{21.333}O_{32}$ with 5-15 parts by weight of anatase-type $TiO_2$, 2-8 parts by weight of $K_2O$, 5-20 parts by weight of γ-$Al_2O_3$ and 5-10 parts by weight of a binder to form a second mixture, followed by roll molding at room temperature and drying the second mixture to produce the desulfurizer. In a preferred embodiment, the anatase-type $TiO_2$, $K_2O$ and γ-$Al_2O_3$ in step (2) are prepared by mixing and calcining 6.1-18.4 parts by weight of metatitanic acid $TiO(OH)_2$, 2.9-11.7 parts by weight of $K_2CO_3$ and 5.9-23.5 parts by weight of pseudo-boehmite (i.e. boehmite) at a temperature of 500-700° C. The inventors found that the desulfurizer, prepared using the mixture of the anatase-type $TiO_2$, $K_2O$ and γ-$Al_2O_3$ obtained by calcining the metatitanic acid, $K_2CO_3$ and pseudo-boehmite together, has an unexpectedly excellent sulfur capacity.

The present invention has the following advantages:

(1) The desulfurizer for conversion and absorption of high-concentration carbonyl sulfide comprises magnetic iron oxide red $Fe_{21.333}O_{32}$, anatase-type $TiO_2$, alkali metal oxide $K_2O$ and a binder, which ensures that the desulfurizer can achieve conversion and absorption of carbonyl sulfide contained in a gas under moderate temperature, can treat carbonyl sulfide with a wide range of concentration to achieve complete removal of high-concentration carbonyl sulfide, and has a high sulfur capacity when applied at low temperature and moderate temperature. In the present invention, the anatase-type $TiO_2$, alkali metal oxide $K_2O$ and magnetic iron oxide red $Fe_{21.333}O_{32}$ in specific contents can work synergetically to impart optimized alkaline activity centers to the desulfurizer, so the desulfurizer has excellent conversion and absorption rate even if used in a condition where the carbonyl sulfide has a high-concentration.

(2) Among the components of the desulfurizer for conversion and absorption of high-concentration carbonyl sulfide, the anatase-type $TiO_2$ is prepared using ferrous sulfate recycled as a by-product from titanium dioxide production by a sulfuric acid method. The titanium dioxide production by a sulfuric acid method comprises decomposing ilmenite ($FeTiO_3$) with sulfuric acid to form titanium and iron sulfates which then dissolves in the reaction solution. Subsequently iron ions crystallizes as ferrous sulfate solid ($FeSO_4 \cdot 7H_2O$) which can be separated from the titaniferous solution as a principal by-product. The obtained ferrous sulfate solid contains Ti in an approximate amount of 5%. So far, the ferrous sulfate solid as by-product has not got effectively recycled for further utilization. The present invention employs this by-product and recycles the Ti ion contained therein to prepare metatitanic acid, thus effectively reducing the cost for producing the desulfurizer.

(3) The desulfurizer for catalytic conversion and absorption of carbon disulfide comprises magnetic iron oxide red $Fe_{21.333}O_{32}$, anatase-type $TiO_2$, alkali metal oxide $K_2O$ and γ-$Al_2O_3$ and a binder, which ensures that the desulfurizer can achieve conversion and absorption of $CS_2$ contained in a gas under moderate temperature, can treat $CS_2$ with a wide range of concentration to achieve complete removal of high-concentration $CS_2$, and has a high sulfur capacity when applied at moderate temperature. In the present invention, the anatase-type $TiO_2$, alkali metal oxide $K_2O$ and γ-$Al_2O_3$ and magnetic iron oxide red $Fe_{21.333}O_{32}$ in specific contents can work synergetically to impart optimized alkaline activity centers to the desulfurizer, so the desulfurizer has excellent conversion and absorption efficiency even if used in a condition where the $CS_2$ has a high concentration.

(4) Among the components of the desulfurizer for catalytic conversion and absorption of carbon disulfide, the anatase-type $TiO_2$ is prepared using ferrous sulfate recycled as a by-product from titanium dioxide production by a sulfuric acid method. The titanium dioxide production by a sulfuric acid method comprises decomposing ilmenite ($FeTiO_3$) with sulfuric acid to form titanium and iron sulfates which then dissolves in the reaction solution. Subsequently iron ions crystallizes as ferrous sulfate solid ($FeSO_4 \cdot 7H_2O$) which can be separated from the titaniferous solution as a principal by-product. The obtained ferrous sulfate solid contains Ti in an approximate amount of 5%. So far, the ferrous sulfate solid as by-product has not got effectively recycled for further utilization. The present invention employs this by-product and recycles the Ti ion contained therein to prepare metatitanic acid, thus effectively reducing the cost for producing the desulfurizer.

BRIEF DESCRIPTION OF DRAWINGS

FIG. 1 shows the XRD pattern of the magnetic iron oxide red $Fe_{21.333}O_{32}$ prepared in the present invention.

DESCRIPTION OF EMBODIMENTS

Example 1

The Preparation of Metatitanic Acid
Addling 5 kg of ferrous sulfate solid which is a by-product from titanium dioxide production by a sulfuric acid method into a reactor, dissolving the ferrous sulfate solid with 6 L of water to form a ferrous sulfate solution, heating the ferrous sulfate solution at 60° C. for 30 min, adjusting a pH value of the ferrous sulfate solution to 1 by adding an acid, and reacting the ferrous sulfate solution with polyacrylamide as a flocculating agent to yield a precipitate, followed by filtering the precipitate while hot to obtain a metatitanic acid solid A, and finally drying the metatitanic acid solid A at 110° C. for 1 h.

Adding 1.67 kg of ferrous sulfate solid which is a by-product from titanium dioxide production by a sulfuric acid method into a reactor, dissolving the ferrous sulfate solid with 6 L of water to form a ferrous sulfate solution, heating the ferrous sulfate solution at 100° C. for 30 min, adjusting a pH value of the ferrous sulfate solution to 2 by adding an acid, and reacting the ferrous sulfate solution with a flocculating agent polyacrylamide to yield a precipitate, followed by filtering the precipitate while hot to obtain a metatitanic acid solid B, and finally drying the metatitanic acid solid B at 110° C. for 1 h.

Example 2

The Preparation of Anatase Type $TiO_2$ and $K_2O$

Mixing the metatitanic acid A prepared by example 1 and $K_2CO_3$ and calcining at a temperature of 500° C. to obtain the anatase type $TiO_2$ and $K_2O$.

Example 3

The desulfurizer of the present example comprises magnetic iron oxide red $Fe_{21.333}O_{32}$ in an amount of 50 parts by weight, anatase-type $TiO_2$ in an amount of 5 parts by weight, $K_2O$ in an amount of 5 parts by weight, and bentonite in an amount of 5 parts by weight.

The method for preparing the desulfurizer for catalytic conversion and absorption of carbonyl sulfide comprises:

(1) putting 500 g of $FeSO_4.7H_2O$ solid into a beaker, adding 6 L of water into the beaker and putting the beaker into a water bath at 40° C. until the solid therein is completely dissolved to form a $FeSO_4$ solution, adding 190 g of $Na_2CO_3$ into the $FeSO_4$ solution by controlling the alkali ratio of the $Na_2CO_3$ and $FeSO_4$ to 1, and reacting for 2 h under stirring to form a first mixture; then filtering the first mixture to yield a filter cake, and calcining the filter cake at a temperature of 350° C. for 3 h to yield the magnetic iron oxide red $Fe_{21.333}O_{32}$; and (2) mixing 50 parts by weight of the magnetic iron oxide red $Fe_{21.333}O_{32}$ with 5 parts by weight of anatase-type $TiO_2$, 5 parts by weight of $K_2O$, and 5 parts by weight of bentonite to form a second mixture, followed by roll molding at room temperature to form balls having diameter of 4 to 6 mm, and drying the balls to produce the desulfurizer.

The anatase-type $TiO_2$ and $K_2O$ in the present example are prepared by the example 2.

Example 4

The desulfurizer of the present example comprises magnetic iron oxide red $Fe_{21.333}O_{32}$ in an amount of 75 parts by weight; anatase-type $TiO_2$ in an amount of 35 parts by weight; $K_2O$ in an amount of 10 parts by weight; and Yang Gan soil in an amount of 10 parts by weight.

The method for preparing the desulfurizer for catalytic conversion and absorption of carbonyl sulfide comprises:

(1) mixing 500 g of $FeSO_4.7H_2O$ solid with 333 g of $NaHCO_3$ solid by controlling the alkali ratio of $NaHCO_3$ and $FeSO_4.7H_2O$ to 1.1 and kneading them in a coating pan for 2 h to yield a first mixture; followed by washing with water for 3 times and filtering the first mixture to yield a filter cake, and calcining the filter cake at a temperature of 350° C. for 3 h to yield the magnetic iron oxide red $Fe_{21.333}O_{32}$, which is then ground and screened to obtain $Fe_{21.333}O_{32}$ powder of 200 mesh; and (2) mixing 75 parts by weight of the magnetic iron oxide red $Fe_{21.333}O_{32}$ with 35 parts by weight of anatase-type $TiO_2$, 10 parts by weight of $K_2O$, and 10 parts by weight of Yang Gan soil to form a second mixture, followed by roll molding at room temperature to form balls having diameter of 4 to 6 mm, and drying the balls to produce the desulfurizer.

The anatase-type $TiO_2$ and $K_2O$ in the present example are prepared by example 2.

Example 5

The desulfurizer of the present example comprises magnetic iron oxide red $Fe_{21.333}O_{32}$ in an amount of 59 parts by weight; anatase-type $TiO_2$ in an amount of 15 parts by weight; $K_2O$ in an amount of 8 parts by weight; and attapulgite in an amount of 5 parts by weight.

The method for preparing the desulfurizer for catalytic conversion and absorption of carbonyl sulfide comprises:

(1) putting 500 g of $FeSO_4.7H_2O$ solid into a beaker, adding 454 mL of water into the beaker and putting the beaker into a water bath at 40° C. until the solid therein is completely dissolved to form a $FeSO_4$ solution, adding 190 g of $Na_2CO_3$ into the $FeSO_4$ solution by controlling the alkali ratio of the $Na_2CO_3$ and $FeSO_4$ to 1, and reacting for 2 h under stirring to form a first mixture; followed by suction filtration to yield a filter cake, and washing the filter cake with water for 3 times and calcining the filter cake at a temperature of 350° C. for 3 h to yield the magnetic iron oxide red $Fe_{21.333}O_{32}$, which is ground and screened to obtain $Fe_{21.333}O_{32}$ powder of 200 mesh; and (2) mixing 59 parts by weight of the magnetic iron oxide red $Fe_{21.333}O_{32}$ with 15 parts by weight of anatase-type $TiO_2$, 8 parts by weight of $K_2O$, and 5 parts by weight of attapulgite to form a second mixture, followed by roll molding at room temperature to form balls having diameter of 4 to 6 mm, and drying the balls to produce the desulfurizer.

The anatase-type $TiO_2$ and $K_2O$ in the present example are prepared by calcining a mixture of 18.4 parts by weight of metatitanic acid B of example 1 and 11.7 parts by weight of $K_2CO_3$ at 500° C.

Example 6

The desulfurizer of the present example comprises magnetic iron oxide red $Fe_{21.333}O_{32}$ in an amount of 59 parts by weight; anatase-type $TiO_2$ in an amount of 5 parts by weight; $K_2O$ in an amount of 5 parts by weight; and bentonite in an amount of 10 parts by weight.

The method for preparing the desulfurizer for catalytic conversion and absorption of carbonyl sulfide comprises:

(1) putting 500 g of $FeSO_4.7H_2O$ solid into a beaker, adding 454 mL of water into the beaker and putting the beaker into a water bath at 40° C. until the solid therein is completely dissolved to form a $FeSO_4$ solution, adding 190 g of $Na_2CO_3$ into the $FeSO_4$ solution by controlling the alkali ratio of the $Na_2CO_3$ and $FeSO_4$ to 1, and reacting for 2 h under stirring to form a first mixture; followed by suction filtration to yield a filter cake, washing the filter cake with water for 3 times and calcining the filter cake at a temperature of 350° C. for 3 h to yield the magnetic iron oxide red $Fe_{21.333}O_{32}$, which is ground and screened to obtain $Fe_{21.333}O_{32}$ powder of 200 mesh; and (2) mixing 59 parts by weight of the magnetic iron oxide red $Fe_{21.333}O_{32}$ with 5 parts by weight of anatase-type $TiO_2$, 5 parts by weight of $K_2O$, and 10 parts by weight of bentonite to form a second mixture, followed by roll molding at room temperature to form balls having diameter of 4 to 6 mm, and drying the balls to produce the desulfurizer.

The anatase-type $TiO_2$ and $K_2O$ in the present example are prepared by calcining a mixture of 6.4 parts by weight of metatitanic acid A of example 1 and 7.3 parts by weight of $K_2CO_3$ at 700° C.

Example 7

The Preparation of Anatase Type $TiO_2$, $K_2O$ and $\gamma$-$Al_2O_3$

The anatase type $TiO_2$ and $K_2O$ and $\gamma$-$Al_2O_3$ are prepared by calcining metatitanic acid A prepared by example 1, $K_2CO_3$ and pseudo-boehmite at a temperature of 500° C. respectively.

Example 8

The desulfurizer of the present example comprises magnetic iron oxide red $Fe_{21.333}O_{32}$ in an amount of 50 parts by weight; anatase-type $TiO_2$ in an amount of 5 parts by weight; $K_2O$ in an amount of 2 parts by weight; $\gamma$-$Al_2O_3$ in an amount of 5 parts by weight; and bentonite in an amount of 5 parts by weight.

The method for preparing the desulfurizer for catalytic conversion and absorption of carbon disulfide comprises:

(1) putting 500 g of $FeSO_4 \cdot 7H_2O$ solid into a beaker, adding 454 mL of water into the beaker and putting the beaker into a water bath at 40° C. until the solid therein is completely dissolved to form a $FeSO_4$ solution, adding 190 g of $Na_2CO_3$ into the $FeSO_4$ solution by controlling the alkali ratio of the $Na_2CO_3$ and $FeSO_4$ to 1, and reacting for 2 h under stirring to form a first mixture; then filtering the first mixture to yield a filter cake, and calcining the filter cake at a temperature of 350° C. for 3 h to yield the magnetic iron oxide red $Fe_{21.333}O_{32}$ which has a XRD pattern as shown in FIG. 1; and (2) mixing 50 parts by weight of the magnetic iron oxide red $Fe_{21.333}O_{32}$ with 5 parts by weight of anatase-type $TiO_2$, 2 parts by weight of $K_2O$, 5 parts by weight of $\gamma$-$Al_2O_3$, and 5 parts by weight of bentonite to form a second mixture, followed by roll molding at room temperature to form balls having diameter of 4 to 6 mm, and drying the balls to produce the desulfurizer.

The anatase-type $TiO_2$, $K_2O$ and $\gamma$-$Al_2O_3$ in the present example are prepared by example 7.

Example 9

The desulfurizer of the present example comprises magnetic iron oxide red $Fe_{21.333}O_{32}$ in an amount of 75 parts by weight; anatase-type $TiO_2$ in an amount of 15 parts by weight; $K_2O$ in an amount of 8 parts by weight; $\gamma$-$Al_2O_3$ in an amount of 20 parts by weight; and Yang Gan soil in an amount of 10 parts by weight.

The method for preparing the desulfurizer for catalytic conversion and absorption of carbon disulfide comprises:

(1) mixing 500 g of $FeSO_4 \cdot 7H_2O$ solid with 333 g of $NaHCO_3$ solid by controlling the alkali ratio of $NaHCO_3$ and $FeSO_4 \cdot 7H_2O$ to 1.1 and kneading them in a coating pan for 2 h to yield a first mixture; followed by washing with water for 3 times and filtering the first mixture to yield a filter cake, and calcining the filter cake at a temperature of 350° C. for 3 h to yield the magnetic iron oxide red $Fe_{21.333}O_{32}$, which is ground and screened to obtain $Fe_{21.333}O_{32}$ powder of 200 mesh; and (2) mixing 75 parts by weight of the magnetic iron oxide red $Fe_{21.333}O_{32}$ with 15 parts by weight of anatase-type $TiO_2$, 8 parts by weight of $K_2O$, 20 parts by weight of $\gamma$-$Al_2O_3$, and 10 parts by weight of Yang Gan soil to form a second mixture, followed by roll molding at room temperature to form balls having diameter of 4 to 6 mm, and drying the balls to produce the desulfurizer.

The anatase-type $TiO_2$, $K_2O$ and $\gamma$-$Al_2O_3$ in the present example are prepared by example 7.

Example 10

The desulfurizer of the present example comprises magnetic iron oxide red $Fe_{21.333}O_{32}$ in an amount of 59 parts by weight; anatase-type $TiO_2$ in an amount of 15 parts by weight; $K_2O$ in an amount of 8 parts by weight; $\gamma$-$Al_2O_3$ in an amount of 16 parts by weight; and attapulgite in an amount of 5 parts by weight.

The method for preparing the desulfurizer for catalytic conversion and absorption of carbon disulfide comprises:

(1) putting 500 g of $FeSO_4 \cdot 7H_2O$ solid into a beaker, adding 454 mL of water into the beaker and putting the beaker into a water bath at 40° C. until the solid therein is completely dissolved to form a $FeSO_4$ solution, adding 190 g of $Na_2CO_3$ into the $FeSO_4$ solution by controlling the alkali ratio of the $Na_2CO_3$ and $FeSO_4$ to 1, and reacting for 2 h under stirring to form a first mixture; followed by suction filtration to yield a filter cake, and washing the filter cake with water for 3 times and calcining the filter cake at a temperature of 350° C. for 3 h to yield the magnetic iron oxide red $Fe_{21.333}O_{32}$, which is ground and screened to obtain $Fe_{21.333}O_{32}$ powder of 200 mesh; and (2) mixing 59 parts by weight of the magnetic iron oxide red $Fe_{21.333}O_{32}$ with 5 parts by weight of anatase-type $TiO_2$, 8 parts by weight of $K_2O$, 16 parts by weight of $\gamma$-$Al_2O_3$ and 5 parts by weight of attapulgite to form a second mixture, followed by roll molding at room temperature to form balls having diameter of 4 to 6 mm, and drying the balls to produce the desulfurizer.

The anatase-type $TiO_2$, $K_2O$ and $\gamma$-$Al_2O_3$ in the present example are prepared by calcining a mixture of 6.1 parts by weight of metatitanic acid B of example 1, 11.7 parts by weight of $K_2CO_3$ and 18.8 parts by weight of pseudo-boehmite at 500° C.

Example 11

The desulfurizer of the present example comprises magnetic iron oxide red $Fe_{21.333}O_{32}$ in an amount of 59 parts by weight; anatase-type $TiO_2$ in an amount of 5 parts by weight; $K_2O$ in an amount of 2 parts by weight; $\gamma$-$Al_2O_3$ in an amount of 5 parts by weight; and bentonite in an amount of 10 parts by weight.

The method for preparing the desulfurizer for catalytic conversion and absorption of carbon disulfide comprises:

(1) putting 500 g of $FeSO_4 \cdot 7H_2O$ solid into a beaker, adding 454 mL of water into the beaker and putting the beaker into a water bath at 40° C. until the solid therein is completely dissolved to form a $FeSO_4$ solution, adding 190 g of $Na_2CO_3$ into the $FeSO_4$ solution by controlling the alkali ratio of the $Na_2CO_3$ and $FeSO_4$ to 1, and reacting for 2 h under stirring to form a first mixture; followed by suction filtration to yield a filter cake, and washing the filter cake with water for 3 times and calcining the filter cake at a temperature of 350° C. for 3 h to yield the magnetic iron oxide red $Fe_{21.333}O_{32}$, which is ground and screened to obtain $Fe_{21.333}O_{32}$ powder of 200 mesh; and (2) mixing 59 parts by weight of the magnetic iron oxide red $Fe_{21.333}O_{32}$ with 5 parts by weight of anatase-type $TiO_2$, 2 parts by weight of $K_2O$, 5 parts by weight of $\gamma$-$Al_2O_3$ and 10 parts by weight of attapulgite to form a second mixture, followed by roll molding at room temperature to form balls having diameter of 4 to 6 mm, and drying the balls to produce the desulfurizer.

The anatase-type $TiO_2$, $K_2O$ and $\gamma$-$Al_2O_3$ in the present example are prepared by calcining a mixture of 6.1 parts by weight of metatitanic acid A of example 1, 2.9 parts by weight of $K_2CO_3$ and 5.9 parts by weight of pseudo-boehmite at 700° C.

The alkaline substance of the present invention for preparing magnetic iron oxide red $Fe_{21.333}O_{32}$ is not limited to the above mentioned $Na_2CO_3$ or NaOH, and also may be selected from the group consisting of $(NH_4)_2CO_3$, $K_2CO_3$, $NH_4HCO_3$, $KHCO_3$, hydroxides of Group IA except for Na, and any combination thereof. As a preferred embodiment, the anatase-type $TiO_2$ is prepared using $FeSO_4$ recycled as a by-product from titanium dioxide production. Alternatively, the anatase-type $TiO_2$ can also be commercially available industrial grade metatitanic acid.

FIG. 1 shows the XRD pattern of the magnetic iron oxide red $Fe_{21.333}O_{32}$ prepared in the present invention.

Test Example 1

In order to demonstrate technical effect of the desulfurizer for conversion and absorption of carbonyl sulfide, the present invention provides the test example 1, the experiment conditions of which are described as follows.

An evaluation test is performed under normal temperatures and normal pressures by using $N_2$ as background gas and by using a standard gas containing 3000 ppm (8571 mgS/m$^3$) of carbonyl sulfide at a space velocity of 500 h$^{-1}$. The desulfurization exhaust gas is detected by chromatography using WDL-94 trace sulfur analyzer. The test terminates when the outlet gas contains 20 ppm of carbonyl sulfide. The WDL-94 trace sulfur analyzer has a minimal measurement of 0.02 ppm.

① COS Hydrolysis Conversion Rate

COS hydrolysis conversion rate (%)=(inlet concentration of COS−outlet concentration of COS)/inlet concentration of COS×100%

② $H_2S$ Removal Rate $H_2S$ removal rate (%)=(inlet concentration of COS−outlet concentration of COS−outlet concentration of $H_2S$)/(inlet concentration of COS−outlet concentration of COS)×100%

③ Sulfur Capacity

Sulfur capacity is calculated when the COS concentration in the outlet gas reaches 20 ppm according to the below formula:

$$X = \frac{\frac{V}{1-C} \times C \times 32 \times 2}{22.4 \times G} \times 100$$

wherein X represents breakthrough sulfur capacity (%); C represents COS content (%) in a gas mixture; V represents volume (L) of gas exclusive of COS measured by a wet gas flow meter after COS is removed; the value 32 is molar mass (g/mol) of sulphur; 22.4 is molar volume (L/mol) of ideal gas under standard condition; G represents the mass (g) of a desulfurizer sample (dry sample).

The results are listed in the following table:

| | COS hydrolysis conversion rate | $H_2S$ removal rate | Outlet concentration of COS | Sulfur capacity |
|---|---|---|---|---|
| Example 1 | >99.9% | >99.9% | <0.02 | 28% |
| Example 2 | >99.9% | >99.9% | <0.02 | 30% |
| Example 3 | >99.9% | >99.9% | <0.02 | 33% |
| Example 4 | >99.9% | >99.9% | <0.02 | 33% |
| Example 5 | >99.9% | >99.9% | <0.02 | 49% |
| Example 6 | >99.9% | >99.9% | <0.02 | 51% |

Test Example 2

In order to demonstrate technical effect of the desulfurizer for catalytic conversion and absorption of carbon disulfide, the present invention provides the test example 2, the experiment conditions of which are described as follows:

An evaluation test is performed under normal temperatures and normal pressures by using $N_2$ as background gas and by using a standard gas containing 3000 ppm (8571 mgS/m$^3$) of $CS_2$ at a space velocity of 500 h$^{-1}$. The desulfurization exhaust gas is detected by chromatography using WDL-94 trace sulfur analyzer. The test terminates when the $CS_2$ concentration in the outlet gas reaches 20 ppm. The WDL-94 trace sulfur analyzer has a minimal measurement of 0.02 ppm.

① $CS_2$ Hydrolysis Conversion Rate $CS_2$ hydrolysis conversion rate (%)=(inlet concentration of $CS_2$−outlet concentration of $CS_2$)/inlet concentration of $CS_2$×100%

② $H_2S$ Removal Rate $H_2S$ removal rate (%)=(inlet concentration of $CS_2$−outlet concentration of $CS_2$−outlet concentration of COS−outlet concentration of $H_2S$)/(inlet concentration of $CS_2$−outlet concentration of $CS_2$−outlet concentration of COS)×100%

③ Sulfur Capacity

Sulfur capacity is calculated when the $CS_2$ concentration in the outlet gas reaches 20 ppm according to the below formula:

$$X = \frac{\frac{V}{1-C} \times C \times 32 \times 2}{22.4 \times G} \times 100$$

wherein X represents breakthrough sulfur capacity (%); C represents COS content (%) in a gas mixture; V represents volume (L) of gas exclusive of COS measured by a wet gas flow meter after COS is removed; the value 32 is molar mass (g/mol) of sulphur; 22.4 is molar volume (L/mol) of ideal gas under standard condition; G represents the mass (g) of a desulfurizer sample (dry sample).

The results are listed in the following table:

| | CS$_2$ hydrolysis conversion rate | H$_2$S removal rate | Outlet concentration of CS$_2$ | Sulfur capacity |
|---|---|---|---|---|
| Example 1 | >99.9% | >99.9% | <0.02 | 20% |
| Example 7 | >99.9% | >99.9% | <0.02 | 19% |
| Example 8 | >99.9% | >99.9% | <0.02 | 19% |
| Example 9 | >99.9% | >99.9% | <0.02 | 19% |
| Example 10 | >99.9% | >99.9% | <0.02 | 36% |
| Example 11 | >99.9% | >99.9% | <0.02 | 38% |

Comparative Example 1

In order to further demonstrate technical effect of the desulfurizer for conversion and absorption of carbonyl sulfide, the present invention provides the comparative example 1 which is described as follows:

Taking 100 g of γ-Al$_2$O$_3$ powder particles as carrier of the desulfurizer, impregnating 10 g of K$_2$CO$_3$ on the γ-Al$_2$O$_3$ by using an incipient impregnation method, followed by drying at 120° C. to obtaining the desulfurizer. An evaluation test is performed with the desulfurizer under same conditions of test example 1. The results indicate in the condition of 3000 ppm of CS$_2$, COS hydrolysis conversion rate is 88%, H$_2$S removal rate is 92%, and sulfur capacity is 16%.

By comparison it can be seen that, the desulfurizer for conversion and absorption of carbonyl sulfide has a higher COS hydrolysis conversion rate, a higher H$_2$S removal rate and a higher sulfur capacity when applied in a high-concentration carbonyl sulfide condition.

Comparative Example 2

In order to further demonstrate technical effect of the desulfurizer for catalytic conversion and absorption of carbon disulfide, the present invention provides the comparative example 2 which is described as follows:

Taking 86 g of γ-Al$_2$O$_3$ powder particles as carrier of the desulfurizer, impregnating a mixed solution of 17.44 g of Zr(NO$_3$)$_4$.5H$_2$O and 5.32 g of La(NO$_3$)$_3$.6H$_2$O on the γ-Al$_2$O$_3$ by using an incipient impregnation method for 2 h, followed by drying for 4 h at 100° C. and calcining for 4 h at 550° C. to obtaining a carrier loaded with Zr and La; then impregnating 10.3 g of K$_2$CO$_3$ on the carrier loaded with Zr and La by using an incipient impregnation method for 2 h, followed by drying for 4 h at 100° C. and calcining for 4 h at 550° C. to obtain a material having a composition of 7 wt % K$_2$O-5 wt % ZrO$_2$-25 wt % LaO-86 wt % γ-Al$_2$O$_3$, followed by roll molding at room temperature to form balls having diameter of 4 to 6 mm and drying the balls to produce the desulfurizer. An evaluation test is performed with the desulfurizer under same conditions of the test example 2. The results indicate in the condition of 3000 ppm of CS$_2$, CS$_2$ hydrolysis conversion rate is 89%, H$_2$S removal rate is 92%, and sulfur capacity is 16%.

By comparison it can be seen that, the desulfurizer for catalytic conversion and absorption of carbon disulfide has a higher CS$_2$ hydrolysis conversion rate, a higher H$_2$S removal rate and a higher sulfur capacity when applied in a high-concentration carbon disulfide condition.

It is obvious the above embodiments are merely examples for clear illustration, rather than limit the application. For those skilled in the art, changes and modifications may be made on the basis of the above description, and it is not necessary and could not exhaust all embodiments, thus obvious changes and modifications derived from the above embodiments still fall within the protection scope of the invention.

The invention claimed is:

1. A method for preparing a desulfurizer, the method comprising:
    (1) mixing and reacting a FeSO$_4$ solution with an alkaline substance solution or solid by controlling the alkali ratio of the alkaline substance solution or solid and the FeSO$_4$ solution to 1-1.1 to form a first mixture, filtering the first mixture to yield a filter cake, and calcining the filter cake at a temperature of 250-400° C. to yield the magnetic iron oxide red Fe$_{21.333}$O$_{32}$; or
    mixing and kneading a FeSO$_4$ solid with an alkaline substance solid by controlling the alkali ratio of the alkaline substance solid and the FeSO$_4$ solid to 1-1.1 to form a first mixture, followed by washing with water and filtering the first mixture to yield a filter cake, and calcining the filter cake at a temperature of 250-400° C. to yield the magnetic iron oxide red Fe$_{21.333}$O$_{32}$; and
    (2) mixing 50-75 parts by weight of the magnetic iron oxide red Fe$_{21.333}$O$_{32}$ with 5-35 parts by weight of anatase type TiO$_2$, 5-10 parts by weight of K$_2$O and 5-10 parts by weight of a binder to form a second mixture, followed by roll molding at room temperature and drying the second mixture to produce the desulfurizer;
    wherein the anatase type TiO$_2$ and K$_2$O in Step (2) are prepared by mixing and calcining 6.1-42.7 parts by weight of metatitanic acid and 7.3-14.7 parts by weight of K$_2$CO$_3$ at a temperature of 500-700° C.

2. The method of claim 1, wherein the filter cake in the step (1) is calcined at 350° C. for 2-5 hours.

3. The method of claim 1, wherein the alkaline substance is selected from the group consisting of hydroxides of Group IA, Na$_2$CO$_3$, (NH$_4$)$_2$CO$_3$, K$_2$CO$_3$, NaHCO$_3$, NH$_4$HCO$_3$, KHCO$_3$ and any combination thereof.

4. The method of claim 1, wherein the metatitanic acid is prepared by a method comprising
    preparing a ferrous sulfate solution by dissolving a ferrous sulfate solid in water, wherein the ferrous sulfate solid is a by-product from titanium dioxide production by a sulfuric acid method,
    heating the ferrous sulfate solution up to 40-100° C.,
    adjusting a pH value of the ferrous sulfate solution to 1-2 by adding an acid, and
    reacting the ferrous sulfate solution with a flocculating agent to yield a precipitate, followed by filtering the precipitate to obtain the metatitanic acid.

5. The method of claim 4, wherein the ferrous sulfate solution has a FeSO$_4$ concentration of 1-2.5 mol/L.

6. The method of claim 4, wherein the acid added for adjusting the pH value is selected from the group consisting of nitric acid, hydrochloric acid, sulfuric acid and any combination thereof.

* * * * *